(12) United States Patent
Fontecchio et al.

(10) Patent No.: US 9,625,878 B2
(45) Date of Patent: Apr. 18, 2017

(54) DYNAMIC TIME MULTIPLEXING FABRICATION OF HOLOGRAPHIC POLYMER DISPERSED LIQUID CRYSTALS FOR INCREASED WAVELENGTH SENSITIVITY

(75) Inventors: Adam K. Fontecchio, Exton, PA (US); Kashma Rai, Malden, MA (US)

(73) Assignee: Drexel University, Philadelphia, PA (US)

( * ) Notice: Subject to any disclaimer, the term of this patent is extended or adjusted under 35 U.S.C. 154(b) by 22 days.

(21) Appl. No.: 12/721,161

(22) Filed: Mar. 10, 2010

(65) Prior Publication Data

US 2010/0231997 A1 Sep. 16, 2010

Related U.S. Application Data

(60) Provisional application No. 61/158,905, filed on Mar. 10, 2009.

(51) Int. Cl.
*G03H 1/02* (2006.01)
*G03H 1/04* (2006.01)
(Continued)

(52) U.S. Cl.
CPC .......... *G03H 1/28* (2013.01); *G02F 1/13342* (2013.01); *G02F 1/29* (2013.01); *G03H 1/04* (2013.01);
(Continued)

(58) Field of Classification Search
None
See application file for complete search history.

(56) References Cited

U.S. PATENT DOCUMENTS 3,702,992 A 11/1972 Sakai
4,447,111 A * 5/1984 Leib ................................ 359/15
(Continued)

FOREIGN PATENT DOCUMENTS

WO   WO 2009/023449   2/2009
WO   WO 2010/045308   4/2010
(Continued)

OTHER PUBLICATIONS

Kaiser et al. "Chirped switchable reflection grating in holographic polymer-dispersed liquid crystal for spectral flattening in free space optical communication systems", Appl. Opt., vol. 43(32) pp. 5996-6000 (Nov. 2004).*
(Continued)

*Primary Examiner* — Martin Angebranndt
(74) *Attorney, Agent, or Firm* — Baker & Hostetler LLP

(57) ABSTRACT

Described herein is a new holographic polymer dispersed liquid crystal (HPDLC) medium with broadband reflective properties, and a new technique for fabrication of broadband HPDLC mediums. The new technique involves dynamic variation of the holography setup during HPDLC formation, enabling the broadening of the HPDLC medium's wavelength response. Dynamic variation of the holography setup may include the rotation and/or translation of one or more motorized stages, allowing for time and spatial, or angular, multiplexing through variation of the incident angles of one or more laser beams on a pre-polymer mixture during manufacture. An HPDLC medium manufactured using these techniques exhibits improved optical response by reflecting a broadband spectrum of wavelengths. A new broadband holographic polymer dispersed liquid crystal thin film polymeric mirror stack with electrically-switchable beam steering capability is disclosed.

23 Claims, 8 Drawing Sheets

(51) Int. Cl.
  *G03H 1/28* (2006.01)
  *G02F 1/1334* (2006.01)
  *G02F 1/29* (2006.01)
  *G03H 1/22* (2006.01)

(52) U.S. Cl.
  CPC ........... *G03H 2001/0439* (2013.01); *G03H 2001/0491* (2013.01); *G03H 2001/2263* (2013.01); *G03H 2222/36* (2013.01); *G03H 2250/38* (2013.01)

(56) References Cited

U.S. PATENT DOCUMENTS

| | | | |
|---|---|---|---|
| 4,500,174 | A | 2/1985 | Conner |
| 4,832,427 | A * | 5/1989 | Nanba et al. .................... 359/15 |
| 5,011,284 | A | 4/1991 | Tedesco et al. |
| 5,120,621 | A * | 6/1992 | Ramsbottom ..................... 430/1 |
| 5,307,187 | A | 4/1994 | Sunohara et al. |
| 5,543,251 | A * | 8/1996 | Taylor ..................... G03H 1/26 359/10 |
| 5,668,901 | A * | 9/1997 | Keck et al. ...................... 385/37 |
| 5,721,630 | A * | 2/1998 | Horner et al. .................. 359/15 |
| 5,725,970 | A * | 3/1998 | Martin et al. ..................... 430/2 |
| 5,751,452 | A * | 5/1998 | Tanaka et al. .................. 349/33 |
| 5,875,012 | A * | 2/1999 | Crawford et al. ............... 349/74 |
| 5,942,157 | A * | 8/1999 | Sutherland et al. .......... 252/582 |
| 6,079,665 | A | 6/2000 | Nella et al. |
| 6,088,321 | A * | 7/2000 | Yamaji et al. ................ 369/103 |
| 6,094,292 | A | 7/2000 | Goldner et al. |
| 6,116,800 | A | 9/2000 | Wang et al. |
| 6,130,732 | A * | 10/2000 | Crawford et al. .............. 349/86 |
| 6,317,189 | B1 | 11/2001 | Yuan et al. |
| 6,525,847 | B2 * | 2/2003 | Popovich et al. .............. 359/15 |
| 6,538,775 | B1 | 3/2003 | Bowley et al. |
| 6,667,215 | B2 | 12/2003 | Theiss et al. |
| 6,689,316 | B1 | 2/2004 | Blyth et al. |
| 6,692,718 | B1 | 2/2004 | Osawa |
| 6,753,994 | B1 | 6/2004 | Russell |
| 6,778,236 | B1 * | 8/2004 | Crawford et al. .............. 349/86 |
| 6,821,457 | B1 | 11/2004 | Natarajan et al. |
| 6,882,477 | B1 * | 4/2005 | Schattenburg et al. ....... 359/577 |
| 7,018,563 | B1 | 3/2006 | Sutherland et al. |
| 7,316,789 | B2 | 1/2008 | Lu |
| 7,771,799 | B2 | 8/2010 | Kobayashi et al. |
| 2001/0019434 | A1* | 9/2001 | Popovich et al. .............. 359/15 |
| 2002/0130988 | A1* | 9/2002 | Crawford et al. .............. 349/86 |
| 2002/0145792 | A1 | 10/2002 | Jacobson et al. |
| 2003/0071948 | A1 | 4/2003 | Felder et al. |
| 2003/0123056 | A1 | 7/2003 | Barnes et al. |
| 2004/0008391 | A1* | 1/2004 | Bowley et al. .................... 359/3 |
| 2004/0137204 | A1 | 7/2004 | Sutehrland et al. |
| 2004/0227940 | A1 | 11/2004 | Mitchell |
| 2005/0018960 | A1* | 1/2005 | De Bougrenet De La Tocnaye et al. .............................. 385/27 |
| 2005/0036677 | A1 | 2/2005 | Ladjevardi |
| 2005/0046936 | A1 | 3/2005 | Dixon et al. |
| 2005/0052609 | A1* | 3/2005 | Pan et al. ..................... 349/195 |
| 2005/0099930 | A1* | 5/2005 | Volodin et al. .......... 369/109.01 |
| 2005/0140837 | A1 | 6/2005 | Crawford et al. |
| 2005/0259217 | A1 | 11/2005 | Lin et al. |
| 2006/0061762 | A1 | 3/2006 | Dwight et al. |
| 2006/0126143 | A1* | 6/2006 | Ezura et al. ..................... 359/24 |
| 2006/0239171 | A1* | 10/2006 | Ooi et al. ................. 369/112.16 |
| 2008/0239420 | A1 | 10/2008 | McGrew |
| 2010/0073605 | A1 | 3/2010 | Masutani et al. |
| 2010/0231997 | A1 | 9/2010 | Fontecchio et al. |
| 2011/0062430 | A1 | 3/2011 | Van Veggel et al. |
| 2011/0199563 | A1 | 8/2011 | Fontecchio et al. |
| 2011/0208462 | A1 | 8/2011 | Maier et al. |
| 2013/0244121 | A1 | 9/2013 | Gogotsi et al. |
| 2013/0341509 | A1 | 12/2013 | Nelson et al. |

FOREIGN PATENT DOCUMENTS

| WO | WO 2012/058652 | 3/2012 |
|---|---|---|
| WO | WO 2013/027006 | 2/2013 |

OTHER PUBLICATIONS

Fontecchio et al., "Multiplexed holographic polymer dispersed liquid crystals". J. Opt. Technol., vol. 68(9) pp. 652-656 (Sep. 2001).*

Fox et al., Holographically formed polymer dispersed liquid crystal films for transmission mode spectrometer applications, Appl. Opt., vol. 46(25) pp. 6277 6282 (Sep. 2007).*

Qi et al., "holographically formed polymer dispersed liquid crystal displays", Displays vol. 25 pp. 177-186 (2004).*

Fontecchio et al., "Diffuse reditions of spatially pixelated and temporally multiplexed H-PDLCs for full color reflective displays", SID 01 Dig. pp. 348-351 (2001).*

Bowley et al., "Reflection from dual domains in a holographically formed polymer dispersed liquid crystal material", Appl. Phys. Lett., vol. 74(21) pp. 3096-3098 (May 1999).*

Qi et al., "Temporally multiplexed holographic polymer dispersed liquid crystals", Appl. Phys. Lett., vol. 82(11) pp. 1652-1654 (Mar. 2003).*

Pu et al. "Exposure schedules for multiplexing holograms in photopolymer films" Opt. Eng., vol. 35(10) pp. 2824-2829 (Oct. 1996).*

NECF Meeting Abstracts, 33rd New England Complex Fluids Meeting, (14 pages), (Nov. 28, 2007), see Rai et al. "Fabrication technique for broadening reflected wavelengths of thin film holograms" abstract 26.*

Massenot "Etude, Modelisation et realization de composants diffractants: contribution a l'etude de materiaux accordables et application a l'enregistrement holographique des filters resonants" Theses, 175 pages (Feb. 2006).*

Rai et al., "Abstract J35.00007: Broadband wavelength spanning holographic polymer dispersed liquid crystals", 1 page (Jul. 2007) http://web.archive.org/web/20070702163724/http://meetings.aps.org/Meeting/MAR08/Event/77340.*

Ermold "Holographic optical elements with electro-optical control" Drexel Univ. (Oct. 2006).*

Fox et al. "Liquid crystal polymer composite films for reconfigurable photomasking applications", Appl. Phys. Lett., vol. 91 14119 (3 pages) (Oct. 2007).*

Ferrari et al. "Effect of the size polydispersity in polymer-dispersed liquid crystal films"., J. Appl. Phys. vol. 103 084505 (4 pages, Apr. 2008).*

Natarajan et al., "Switchable holographic polymer dispersed liquid crystal gratings based upon thiol-ene photopolymerization" Chem. Mater., vol. 15 (12) pp. 2477-2484 (2003).*

"The Future of ITO: Transparent Conductor and ITO Replacement Markets", http://www.researchandmarkets.com/search.asp?q=The%20Future%20of%20ITO:%20Transparent%20Conductor%20and%20ITO%20Replacement%20Markets, NanoMarkets, Mar. 2008, 1 page.

Rai, "Study of Spectral Sensing using Electro-Optic Films", Thesis Submitted to the Faculty Drexel University, Sep. 2009, 180 pages.

Shriyan et al., "Multilayer Stacking Technique for Holographic Polymer Dispersed Liquid Crystals", Applied Physics Letters, 93, 261113, 2008, 3 pages.

Yoo et al., "Plastic Electronics Could Slash The Cost Of Solar Panels", Princeton University, Apr. 14, 2010, 3 pages.

Bowley et al, "Improving the Voltage Response of Holographically-Formed Polymer Dispersed Liquid crystals (H-PDLCs)", Molecular Crystals and Liquid Crystals Science and Technology, Jan. 1, 2001, 359(1), 647-659.

Bunning, T.J. and Vatarajan, I.V., "Holographic Polymer-Dispersed Liquid Crystals (HPDLCs)", Annual Raeview of Materisals Science, Aug. 1, 2000, 30(1), 83-115.

Geis et al. "30 to 50 ns Liquid Crystal Optical Switches", Proc. SPIE, 2010,7618, paper 76180J, 5 pages.

(56) References Cited

OTHER PUBLICATIONS

International Patent Application No. PCT/US2014/025922: International Search report and The Written Opinion dated Nov. 11, 2014, 20 pages.
Jakubiak et al., "Holographic Photopolymerization For Fabrication Of Electrically Switchable Inorganic-Organic Hybrid Photonic Structures", 2003, Proc. SPIE, 4991, 89-97.
Kamanina et al. "Fullerene-Doped Polymer Dispersed Liquid Crystals" Holographic Recording And Optical Limiting Effect, Proc. SPIE, 2001, 4347, 487-492.
Shriyan et al. "Electro-Optical Effect Of Oxidized Multiwalled Carbon Nanotube Doping On Holographic Polymer Dispersed Liquid Crystal Films", Proc. SPIE, 2009, 7414, article 741407, 8 pages.
Woo et al. "Dual Effects Of Fullerene Doped To Holographic Polymer Dispersed Liquid Crystals" J Poly. Sci. A:Poly. Chem., 2007, 45, 5590-5596.
Yaroshchuk et al., "Electro-optics And Structure Of Polymer Dispersed Liquid Crystals Doped With Nanoparticles Of Inorganic Materials" Opt. Mater., 2007, 29,1097-1102.
Rai, K.K., and Fontecchio, A.K., "Fabrication Technique for Increased Interaction Wavelengths of Thin-Film Holograms", ECE Department, Drexel University, Philadelphia, PA, Patent Complex Fluid Workshop Presentation, Nov. 30, 2007, 2 pages.
Liu et al. "Real-time Hyperspectral Imaging with Volume Holographic Optical Elements", Proceedings 2001 International Conference on Image Processing, Oct. 2001, vol. 2, pp. 1049-1052.
Sutherland et al. "Electrically Switchable Volume Gratings in Polymer-Dispersed Liquid Crystals", Appl. Phys. Lett., Feb. 1994, 64(9), 1074-76.

* cited by examiner

DYNAMIC TIME MULTIPLEXING FABRICATION OF HOLOGRAPHIC POLYMER DISPERSED LIQUID CRYSTALS FOR INCREASED WAVELENGTH SENSITIVITY

CROSS-REFERENCE TO RELATED APPLICATIONS

This patent application claims priority to U.S. provisional patent application No. 61/158,905, filed Mar. 10, 2009, which is incorporated herein by reference in its entirety.

GOVERNMENT RIGHTS

This invention was made with government support under Grant No. NNG04G042G awarded by the National Aeronautics and Space Administration (NASA). The government has certain rights in the invention.

BACKGROUND

Conventional holographic polymer dispersed liquid crystal (HPDLC) mediums are formed in a mixture of liquid crystal and a photo-curable monomer. On exposure to a holographic interference pattern, typically formed by coherent lasers, polymerization is initiated, creating a diffusion gradient that in turn causes migration of liquid crystals. Alternating planes of polymer and liquid crystal droplets are formed in the mixture corresponding to the interference pattern, resulting in the formation of a Bragg grating that can reflect a specific wavelength of light. The wavelength of light that will be reflected is determined in part by the incident angle of the laser beams on the mixture during polymerization. Typically, a single Bragg grating is formed, resulting in a narrow peak reflection wavelength, normally in the range of 5 to 20 nm full width at half maximum (FWHM).

A desirable property in HPDLC mediums is the ability to reflect a range of wavelengths of light. Several techniques are typically used to produce this property. In one technique, multiple HPDLC mediums, each reflecting a specific wavelength, are bonded together in a stacked configuration. However, each subsequent HPDLC layer increases the attenuation of light as it passes through stacked HPDLC mediums. The increased attenuation characteristics of stacked HPDLC mediums, combined with the narrow peak reflections of each HPDLC layer, make the manufacture of stacked HPDLC mediums capable of reflecting a broad spectrum of wavelengths difficult and impractical.

Another technique involves the creation of multiple HPDLC Bragg gratings in a single layer through the use of simultaneous, coherent multiple laser beam exposure. Typically, at least two pairs of laser beams are used, with each beam incident on the mixture at a different angle, in order to form an optical interference pattern associated with reflection of a different wavelength of light. This technique may provide HPDLC mediums having a plurality of spectrally overlapping reflectances, giving rise to a range of peak reflected wavelengths within a single medium. However, the range of peak reflected wavelengths results in an HPDLC medium lacking a uniform reflective behavior across a broad range of wavelengths. Additionally, increasing the number of Bragg gratings in a single layer increases the complexity of the hologram fabrication setup and requires additional lasers to maintain a reasonable range of beam irradiance. Despite the availability of the above-discussed techniques, a desire remains for the ability to create HPDLC mediums capable of reflecting a broad range of peak reflected wavelengths.

SUMMARY

Described herein is a new holographic polymer dispersed liquid crystal (HPDLC) medium with broadband reflective properties, and a new technique for fabrication of broadband HPDLC mediums. The new technique involves dynamic variation of the holography setup during HPDLC formation, enabling the broadening of the HPDLC medium's wavelength response. Dynamic variation of the holography setup may include the rotation and/or translation of one or more motorized stages, allowing for time and spatial, or angular, multiplexing through variation of the incident angles of one or more laser beams on a pre-polymer mixture during manufacture. An HPDLC medium manufactured using these techniques exhibits improved optical response by reflecting a broadband spectrum of wavelengths. A new broadband holographic polymer dispersed liquid crystal thin film polymeric mirror stack with electrically switchable beam steering capability is disclosed.

BRIEF DESCRIPTION OF THE DRAWINGS

In the drawings, like reference numerals designate corresponding parts throughout the several views.

FIG. 4A depicts transmission intensity versus wavelength for an example single wavelength reflecting holographic polymer dispersed liquid crystal medium. FIG. 4B depicts transmission intensity versus wavelength for an example broadband wavelength reflecting holographic polymer dispersed liquid crystal medium.

FIG. 5A depicts example nanoscale morphology of a single wavelength reflecting holographic polymer dispersed liquid crystal medium. FIG. 5B depicts example nanoscale morphology of a broadband wavelength reflecting polymer dispersed liquid crystal medium.

FIG. 6A depicts a refractive index profile model of an example broadband grating. FIG. 6B depicts an example output of the broadband grating modeled using the Berreman 4×4 matrix technique.

DETAILED DESCRIPTION

Figure 1A:
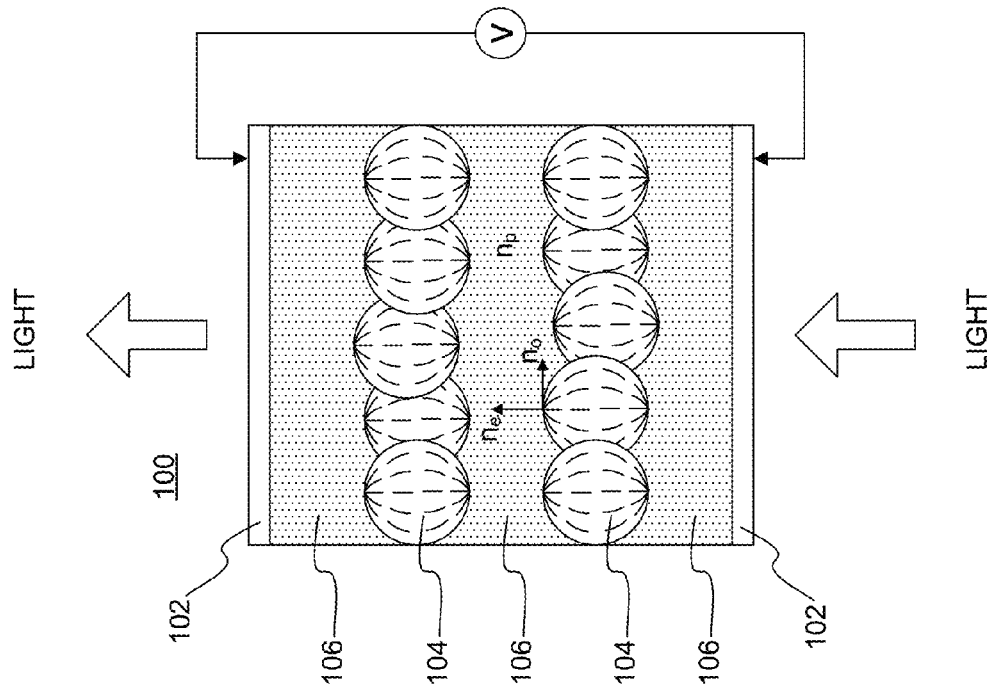
FIGS. 1A and 1B depict an example holographic polymer dispersed liquid crystal medium, with no electric field and with an electric filed applied, respectively.
Figure 1B:
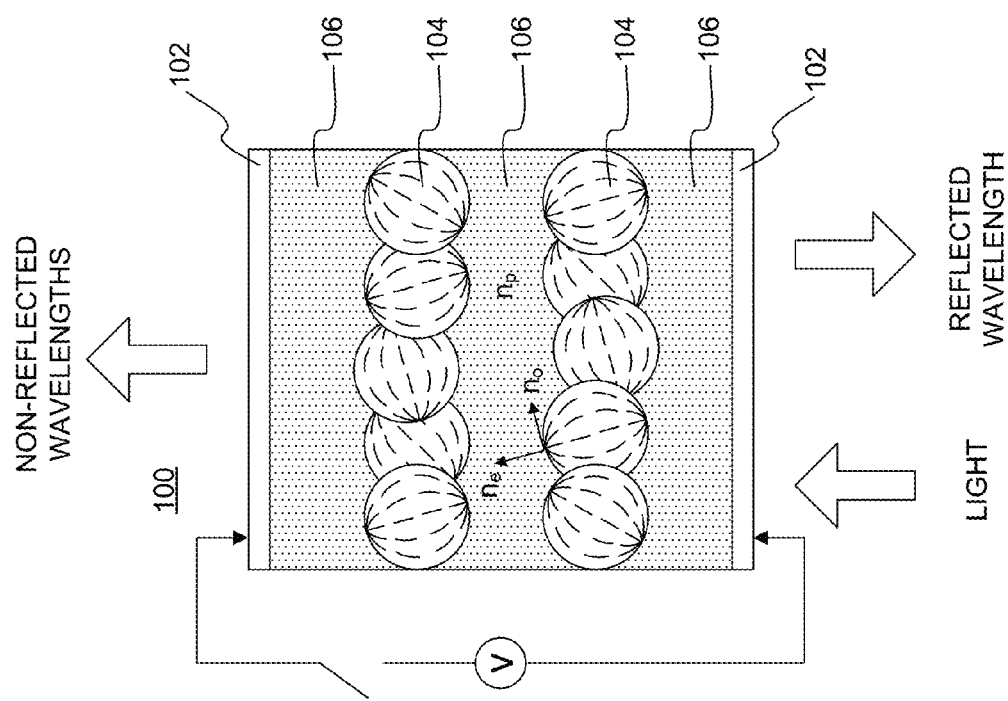

The embodiments disclosed herein refer to methods and apparatuses for use in the generation of holographic polymer dispersed liquid crystal (HPDLC) thin films (or alternatively, films). However, it should be noted that HPDLC mediums other than HPDLC thin films may be created using the methods and apparatuses disclosed herein, and that the scope of the instant disclosure should not be limited thereto. FIGS. 1A-1B depict an example embodiment consisting of a holographic polymer dispersed liquid crystal (HPDLC) thin film 100 (not to scale) containing phase separated compositions formed under holographic conditions. The film may be comprised of a pre-polymer mixture made up of low molecular weight liquid crystals and a photo-curable monomer. An initiator(s) may be added to sensitize the pre-polymer mixture to a particular wavelength of laser light that will be used during the formation process. A layer of the pre-polymer mixture may be placed between AR-ITO coated glass substrates 102 spaced, for example, 5 µm apart.

In an example formation process the pre-polymer mixture may be irradiated with one or more holographic interference patterns generated by one or more laser light beams. The holographic interference patterns produce high-light-intensity, or bright, regions and dark regions in the pre-polymer mixture. Irradiation of the pre-polymer mixture initiates polymerization of the monomer, which in turn induces a phase separation between the polymer and liquid crystals. The rate of polymerization may be approximately proportional to the square root of the light intensity for one-photon polymerization. Therefore, the rate of polymerization may be spatially dependent. During irradiation the monomer diffuses to the bright regions where it polymerizes. The liquid crystal remains in the dark regions and phase separates into small droplets in ordered, stratified layers. Polymer gelation locks the modulated structure indefinitely, resulting in liquid crystal droplet-rich areas where the dark fringes were, and essentially pure polymer regions where the light fringes were. As a result, a periodic array of liquid crystal droplets 104 and matrix polymer planes 106 may be produced, as shown in FIGS. 1A and 1B. The index modulation between the liquid crystal and polymer planes can be estimated from the index of refraction of the individual components. It should be noted that FIGS. 1A and 1B are not to scale, that the number of layers of liquid crystal droplets and polymer depicted therein are merely examples, and that the scope of the instant disclosure should not be limited thereto. The reflection gratings formed may be post-cured with a UV blanket for an interval, for example 10 minutes, to react any unreacted monomers in the HPDLC medium.

The periodically repeating layers of polymer and liquid crystals comprise Bragg gratings. A Bragg grating typically reflects a narrow peak wavelength of light. The grating pitch, which is the width of one adjacent polymer and liquid crystal layer, may be determined by the following equation $$\Lambda = \frac{\lambda}{2n\sin\theta},$$

where λ is the wavelength of the incident laser light, n is the effective refractive index of the polymer and liquid crystal composite, and θ is the angle with respect to the grating at which each of the laser beams is made incident on the pre-polymer mixture. The reflected Bragg peak wavelength, which can also be determined from the above equation, is directly proportional to the grating pitch. Accordingly, to create broadband reflecting gratings, the angle of incidence of the counter propagating beams may be taken into consideration in deciding the reflected wavelength of the HPDLC.

As is known, an electric field may be applied across a standard HPDLC medium to control the intensity of the wavelength of light reflected from the HPDLC. An electric field transforms the HPDLC from a wavelength selective device to an optically transparent state, as depicted in FIG. 1B. Thus, if no field is applied, as depicted in FIG. 1A, the HPDLC will reflect light at specific wavelengths corresponding to the Bragg grating(s) present in the HPDLC. When an electric field is applied, the liquid crystals in the HPDLC align with the direction of the field, making the HPDLC effectively transparent and allowing light to travel through the HPDLC medium. Typically, HPDLC mediums have a narrow peak reflection wavelength with a full width at half maximum (FWHM) varying typically from 5 to 20 nm and based on the thickness of the Bragg grating.

In a preferred embodiment, the liquid crystals may be made of dielectric nematic liquid crystals, which orient in the direction of an external electric field applied to the HPDLC. The refractive index of nematic liquid crystal along the optic axis is called the extraordinary refractive index, represented as $n_e$, and the refractive index perpendicular to it is called the ordinary refractive index, represented as $n_o$.

In an example HPDLC medium, in which the liquid crystal and polymer planes are oriented approximately parallel to the substrates, the operation of the Bragg gratings, serving as reflection gratings, are governed by the Bragg condition $$\lambda = 2\langle n \rangle d$$

for normal incidence. Here, d is the layer thickness and <n> is the average refractive index of the grating which can be approximated by $$\langle n \rangle \approx \phi_P n_P + \phi_{LC} n_{LC}$$

where $\phi_P$ and $\phi_{LC}$ are the volume fraction of the polymer and liquid crystal, respectively, and the average index of the liquid crystal may be given by $$n_{LC} = \sqrt{\frac{2n_o^2 + n_e^2}{3}}.$$

A large refractive index modulation between the liquid crystal rich planes and the surrounding polymer planes will likely yield high diffraction/reflection efficiency and low residual scattering when no field is applied. If the ordinary refractive index of the liquid crystal, $n_o$, matches the refractive index of the polymer, $n_p$, the HPDLC medium reverts to a transparent state (with the material optically homogeneous) upon the application of an electric field, as depicted in FIG. 1B.

Figure 2:
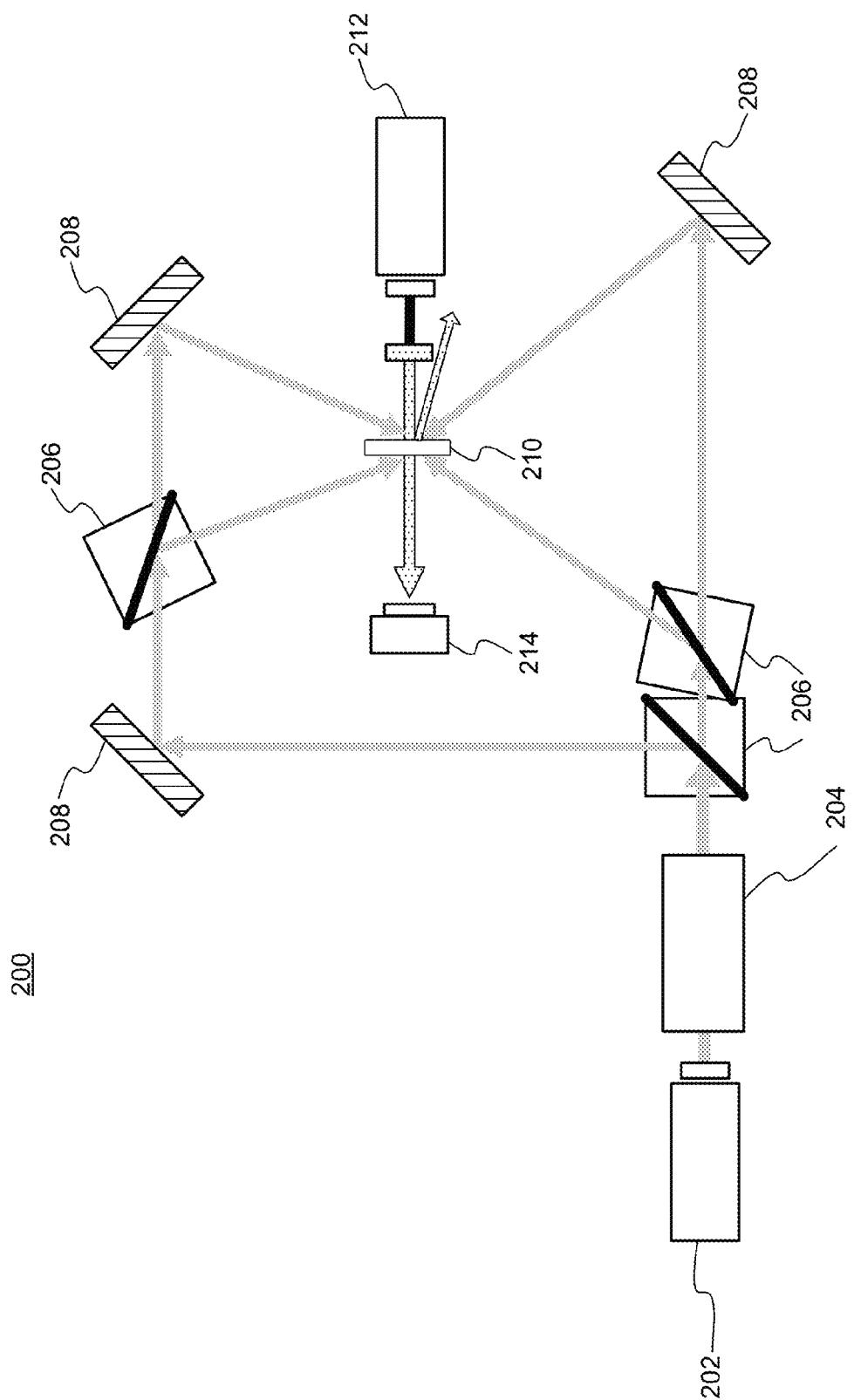
FIG. 2 depicts an example holography setup which may be used in the formation of holographic polymer dispersed liquid crystal mediums.

FIG. 2 depicts an example holography apparatus 200 used in the formation of broadband HPDLC mediums as disclosed herein. It should be noted that the apparatus depicted in FIG. 2 is merely an example embodiment, and that the number and positioning of individual elements of the apparatus could be varied without changing the scope of the claimed subject matter disclosed herein. Various elements of the holography apparatus will now be discussed. In the example apparatus, a fixed laser light source 202 may be focused on a beam expander 204. The laser light source used in the example embodiments is a Verdi Nd:YAG 5 W green laser operating at 532 nm, but laser light sources emitting other wavelengths may be used. The beam expander may also comprise a spatial filter.

After laser light emitted from the laser light source passes through the beam expander and optional spatial filter, the beam may pass through one of more beam splitter plates 206, which may divide a single beam into two beams, and may also redirect the beams in separate directions. The beam splitters may be mounted on fixed stages (not shown), or alternatively may be mounted on motorized translation and/or rotation stages (not shown) that allow the beam splitter to be dynamically rotated and positioned in order to vary how an incident beam is split and/or its intensity varied. A motorized stage may be configured to rotate and/or translate an element mounted thereto in any of an x, y, or z axis. The use of variable beam splitter plates allows the relative intensity of individual beam pairs to be controlled. For example, variable beam splitter plates may be used to divert extra power into a specific beam pair, which in turn may result in more rapid phase separation thereby producing a reflection grating with higher reflection intensity. Conversely, the other beam pair may have a reduced power resulting in slower phase separation thereby producing a reflection grating with lower reflection efficiency. This method permits wavelength mixing in a single film with controlled relative intensity of the individual gratings. In another example embodiment, laser output power may be controlled to enable the formation of notch and bandpass filters in an HPDLC medium.

In another example embodiment, using a series of beam splitters may result in many (e.g., 10) simultaneous interference spacings spread evenly across a grating pitch range. This configuration may be advantageous in the event that the formation of multiple grating pitches in a single volume of pre-polymer mixture requires each individual interference fringe spacing to be persistent during the entire exposure.

Beams of laser light may also be directed through the use of mirrors 208. The mirrors may be mounted on fixed stages (not shown), or alternatively may be mounted on motorized translation and/or rotation stages (not shown) that allow a mirror's surface to be dynamically rotated and positioned in order to vary the angle at which the mirror reflects light. A motorized stage may be configured to rotate and/or translate an element mounted thereto in any of an x, y, or z axis. The beams of laser light may ultimately be focused, for example through the use of beam splitters, mirrors, or the like, on a pre-polymer mixture sample 210 mounted on a sample stage (not shown). The sample stage may be fixed or may be a motorized translation and/or rotation stage.

An optional fixed white light source 212, for example a white light interferometer, may be operated during formation and focused so that it passes through the prepolymer mixture as the HPDLC is formed. Light that passes through the HPDLC may be detected by detector 214. Use of a white light interferometer and an associated detector during HPDLC formation may allow, for example, for various methods of testing, analyzing, and characterizing the performance of HPDLC mediums, discussed in more detail below. The positioning of the white light source and the detector depicted in FIG. 2 is merely an example, and other configurations are possible and intended to be within the scope of this disclosure.

The above described holography apparatus may be utilized to form enhanced broadband HPDLC mediums with broader ranges of reflected wavelengths than can be achieved by typical methods of HPDLC formation. In an embodiment, these enhanced broadband HPDLC mediums may be formed by dynamically varying elements of the above-described holography apparatus during formation. Dynamically varying elements of a holography apparatus may include, for example, the rotation and/or translation of one or more motorized stages having mirrors, beam splitters, or a pre-polymer mixture sample affixed thereto; thus allowing for time and spatial multiplexing during formation, as described in more detail below.

Figure 3B:
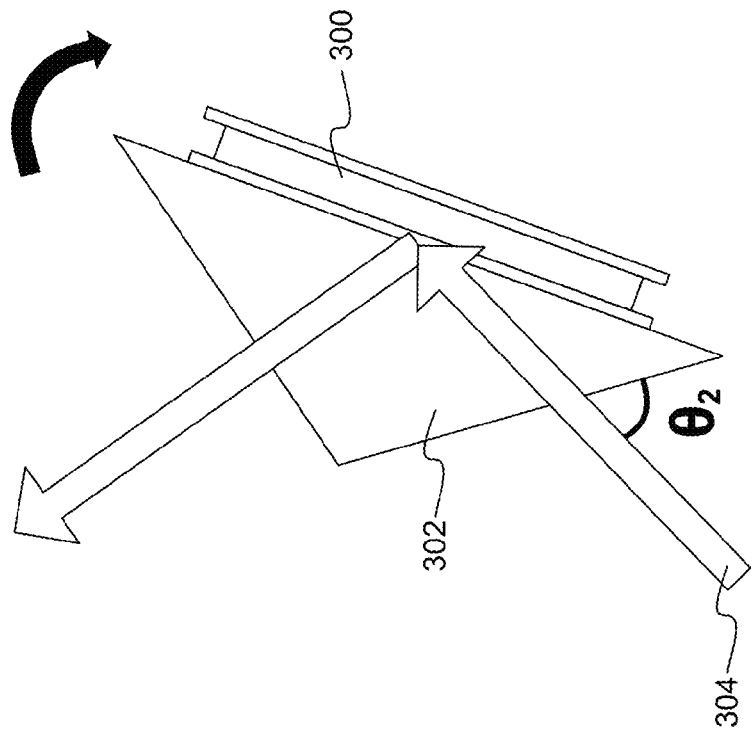
FIGS. 3A and 3B depict an example technique for dynamically varying a holography apparatus during formation of a holographic polymer dispersed liquid crystal medium.
Figure 3A:
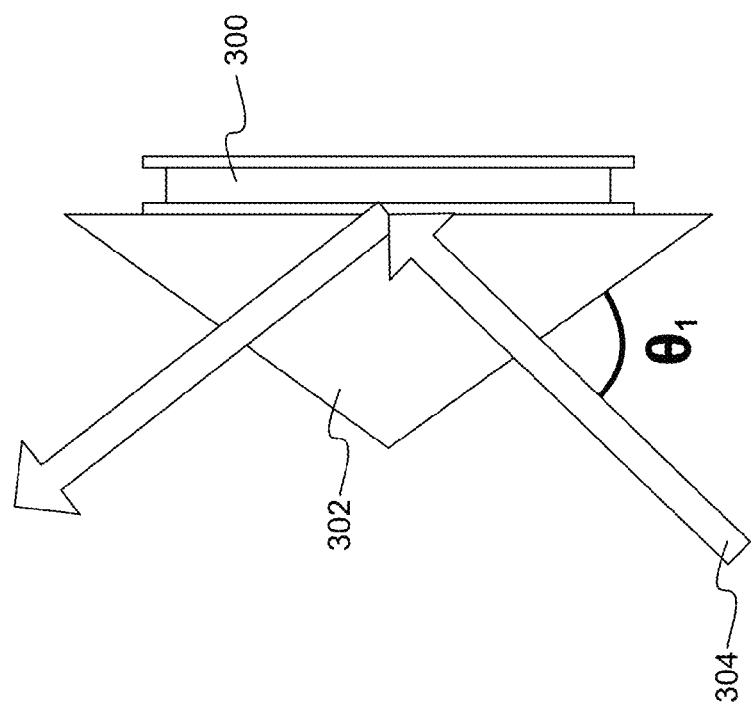

FIGS. 3A and 3B depict an example technique for dynamically varying a holography apparatus during formation to broaden the interaction wavelength of an HPDLC medium via simultaneous time and spatial, or angular, multiplexing. The apparatus of FIG. 2 may be used, and modified as described herein. A pre-polymer sample 300 consisting of a single layer of pre-polymer mixture may be mounted to a motorized translation and/or rotation capable sample stage. In an embodiment, a prism 302 may also be mounted to the sample stage so that the prism makes contact with the pre-polymer sample. A single beam of laser light may be directed to be incident on the prism/sample. As the incident laser beam passes through the prism as depicted in FIGS. 3A and 3B, and is reflected, diffracted, or otherwise affected, interference patterns may be created in the pre-polymer mixture that in turn result in the formation of reflection gratings in the resulting HPDLC medium. During laser beam exposure, the sample stage may rotate and/or translate along one or more of an x, y, or z axis. Rotation and/or translation of the sample stage allows the exposure angles of incident laser beam 304 during grating formation to be varied, for example via clockwise rotation of the sample stage from $\theta_1$ in FIG. 3A to $\theta_2$ in FIG. 3B along an axis perpendicular to the sample. A similar effect may be achieved with the use of a fixed or stationary sample stage, and through varying the angle of incidence of the laser beam itself, for example through the use of mirrors mounted to rotation and/or translation stages. The angle of incidence of the laser beam on the pre-polymer mixture may be varied continuously, or in incremental degrees by controlling the rotation and/or translation of holographic elements accordingly. Varying the angle of incidence of the laser beam on the pre-polymer mixture may cause interference patterns to form in the mixture, in turn resulting in the formation of multiple reflection gratings in the resulting HPDLC medium. These multiple gratings may have varying Bragg grating pitches and/or central wavelengths that overlap spatially and/or spectrally, thus forming an HPDLC medium with continuous broadband gratings capable of reflecting a broad range of wavelengths.

A variation of the single-beam holographic technique depicted in FIGS. 3A and 3B may be achieved by affixing a mirror (not shown) to the back of the pre-polymer mixture sample holder. The prism depicted in FIGS. 3A and 3B may be omitted as a result of adding the mirror to the sample holder. The mirror may induce self-interference in the incident laser beam, creating interference patterns in the pre-polymer mixture that in turn result in the formation of reflection gratings in the resulting HPDLC medium. During laser beam exposure, the sample stage may rotate and/or translate along one or more of an x, y, or z axis. Rotation and/or translation of the sample stage allows the exposure angles of incident laser beam 304 during grating formation to be varied, for example via clockwise rotation of the sample stage from $\theta_1$ in FIG. 3A to $\theta_2$ in FIG. 3B along an axis perpendicular to the sample. A similar effect may be achieved with the use of a fixed or stationary sample stage, and through varying the angle of incidence of the laser beam itself, for example through the use of mirrors mounted to rotation and/or translation stages. The angle of incidence of the laser beam on the pre-polymer mixture may be varied continuously, or in incremental degrees by controlling the rotation and/or translation of holographic elements accordingly. Varying the angle of incidence of the laser beam on the pre-polymer mixture may cause multiple interference patterns to form in the mixture, in turn resulting in the formation of multiple reflection gratings in the resulting HPDLC medium. These multiple gratings may have varying Bragg grating pitches and/or central wavelengths that overlap spatially and/or spectrally, thus forming an HPDLC medium with continuous broadband gratings capable of reflecting a broad range of wavelengths.

In yet another example embodiment of HPDLC formation using angular multiplexing, the holographic exposure apparatus may be configured with multiple pairs of counter-propagating beams, as depicted in FIG. 2. Although two beam pairs (i.e., four beams) are depicted, the scope of the disclosure should not be limited thereto, and additional beam pairs may be added. Additional sources of laser light, of the same or different wavelengths, may also be used in the generation of laser beam pairs. Exposing a sample of pre-polymer mixture using the angular multiplexing technique described herein provides the ability to simultaneously write multiple gratings in a single HPDLC medium. An HPDLC medium having a broadband reflection peak or multiple reflection peaks may result. In order to write two reflection gratings simultaneously, the laser output power may be set to 2 W, and the beam may be expanded and masked to a 1-inch diameter circle. Using beam splitter plates, two beam pairs (i.e., four beams) may be created and aligned so that each beam pair writes a different pitch grating in the HPDLC medium. For example, splitting the 2 W, expanded and masked beam into two beam pairs may result in four beams, with the resultant power in each beam being approximately 100 mW/cm$^2$. As previously mentioned, the use of variable beam splitter plates may allow the relative intensity of the beam pairs to be controlled, thereby allowing for tuning of the reflection intensity of individual reflection gratings formed within the HPDLC medium.

Referring again to FIG. 2, angular multiplexing of the four-beam embodiment may involve rotation and/or translation of the sample stage along one or more axes. In an example embodiment, a sample stage holding the pre-polymer mixture may be so rotated and/or translated in order to alter the angle of incidence of one or more of the laser beams on the surface of the pre-polymer mixture. The rotation and/or translation motion may be continuous, incremental with respect to time, or any combination thereof. Altering the angle of incidence of one or more of the counter-propagating laser beams on the surface of the pre-polymer mixture allows for the creation of multiple interference patterns and in turn multiple reflection gratings in the resulting HPDLC medium. The intensity of one of more of the incident laser beams may be varied, for example by the use of variable beam splitter plates 206, in order to create reflection gratings of varying intensity.

In another example, one or more motorized stages may be employed for rotation and/or translation of other elements of the apparatus, for example beam splitters 206, or mirrors 208. The use of additional motorized stages may be used concurrently with or in lieu of rotation and/or translation of the sample stage. The angle of incidence of one or more of the laser beams on the pre-polymer mixture may be altered via such rotation and/or translation, while one or more remaining laser beams may be held at a fixed angle of incidence. Rotation and/or translation of motorized stages having beam splitters or mirrors mounted thereto may allow for individual or simultaneous focusing of the laser beams, thereby allowing for a high degree of tunability in the creation of interference patterns within the pre-polymer mixture. Simultaneous rotation and or translation of both the sample stage and one or more additional motorized stages with beam splitters or mirrors mounted thereto provides the ability to ensure that individual beams are not reflected, diffracted, or otherwise mitigated by any portion of the physical mounting apparatus of the mounting stage.

Physical limitations of the example holography apparatus 200 may negatively impact the formation process, resulting in reduced quality HPDLCs. For example, the translation and/or rotation speed of motorized elements of the apparatus may be too slow in comparison to the gelation process of the pre-polymer mixture. This effects of this phenomenon may be mitigated by altering the formulation of the pre-polymer mixture to lengthen the time for the gelation process. In an embodiment, this may be achieved by replacing an acrylate formulation with a thiolene formulation.

The above-disclosed angular multiplexing techniques may result in multiplexed broadband Bragg gratings comprising peak reflection wavelengths of approximately 100 nm full width at half maximum (FWHM) or greater. Apparatus configuration parameters that may affect formation include variation speed of the angle of incidence, uniformity of the reflection wavelength, uniformity of the reflection intensity, incident power, and the like.

In order to effectuate transfer of an HPDLC medium by releasing a glass substrate from an HPDLC sample, thereby facilitating grating surface metrology, the surfaces of the glass substrates are treated prior to holographic exposure with a release agent (e.g., surfactants such as Tween and Brix). Treatment with a release agent facilitates complete removal of an HPDLC medium. Following holographic exposure, one glass substrate may be released from the HPDLC medium and HPDLC medium removed. The grating film may then be adhered to an index-matched polymeric substrate coated with an index-matched conducting substrate using the same polymer employed in the grating matrix of the HPDLC medium (e.g., acrylated urethane). An example substrate suited for this purpose is poly-methyl-meth-acrylate (PMMA) coated with Baytron-P conducting polymer, but other substrates may be used. The remaining glass substrate may then be similarly replaced with a second polymeric substrate. If this process is repeated, an index matched completely polymeric HPDLC medium stack may be formed. In an example process, hardening polymers (e.g., Norland Optical Adhesive 63 and/or 68) may be added to the pre-polymer mixture, to increase the toughness of the resulting HPDLC medium.

HPDLC mediums formed using the methods and apparatus disclosed herein often demonstrate reflection efficiencies of 85-90%, switching fields of approximately 15-20 V/µm, and switching times less than 2 ms. Scattering intensities are typically less than $1\times10^{-7}$ dB outside the grating reflection peak. Wavelength shifts are typically less than 0.005λ, which may be measured using, for example, a Zygo white light interferometer.

Figure 4B:
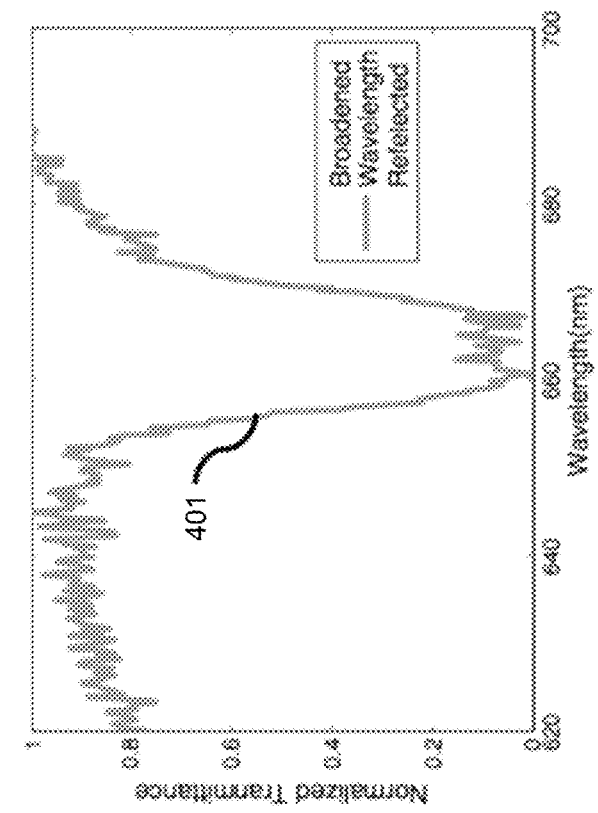
FIGS. 4A and 4B are graphs of transmission intensity versus wavelength.
Figure 4A:
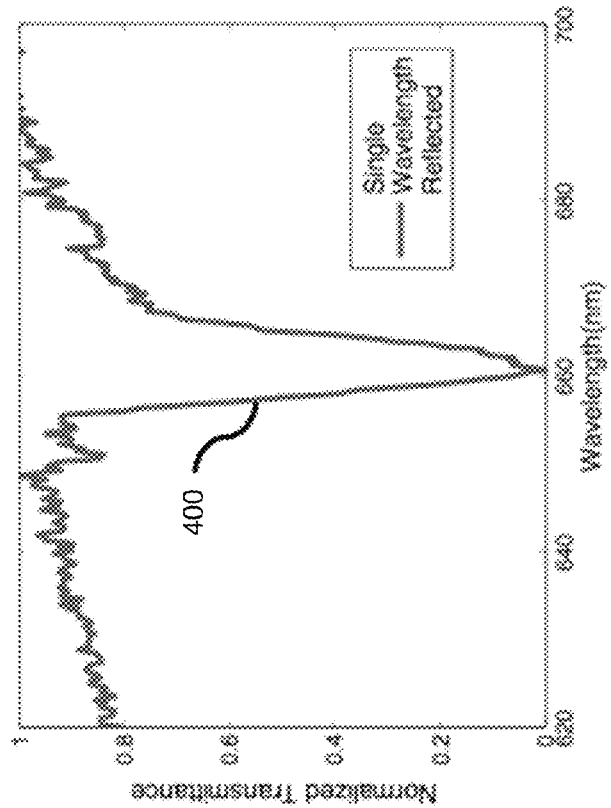

FIGS. 4A and 4B illustrate an example of broadened peak reflective characteristics achievable in an HPDLC medium through the creation of multiple reflections gratings using the techniques disclosed herein, in comparison to peak reflective characteristics of a typical single grating HPDLC medium. The reflective behavior of the example single grating HPDLC medium depicted in FIG. 4A has a normalized peak reflection wavelength with a full width at half maximum (FWHM) of 9 nm at 662.2 nm, depicted by the plotted line 400. FIG. 4B depicts an example HPDLC medium containing multiple reflection gratings created using the techniques disclosed herein. In comparison with the single grating HPDLC medium depicted in FIG. 4A, the multiple reflection grating HPDLC medium depicted in FIG. 4B exhibits a broadened peak reflection wavelength of 15 nm, depicted by the plotted line 401.

Figure 5B:
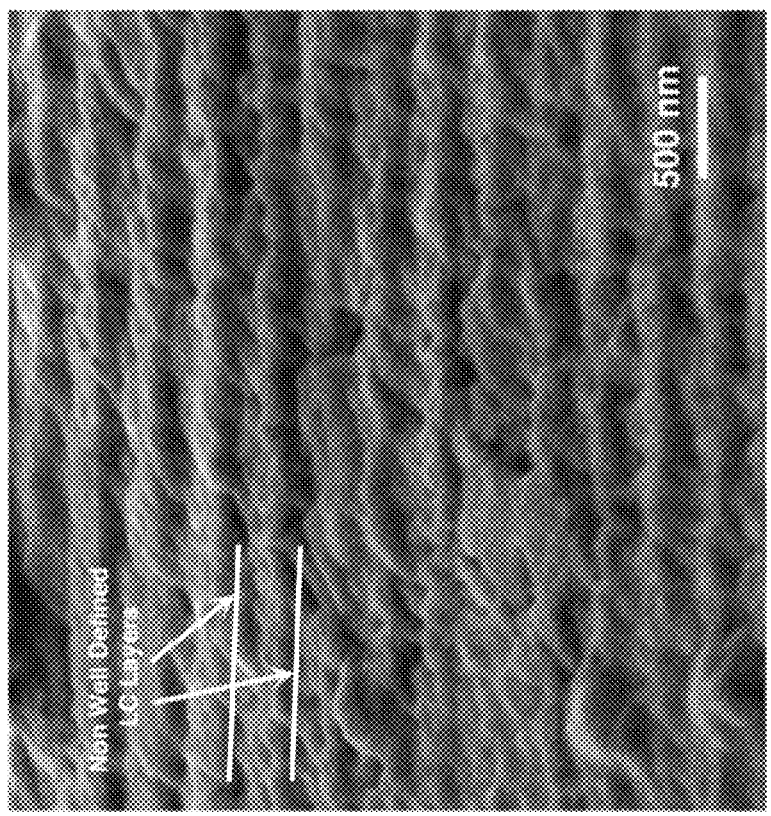
FIGS. 5A and 5B depict images obtained using scanning electron micrography.
Figure 5A:
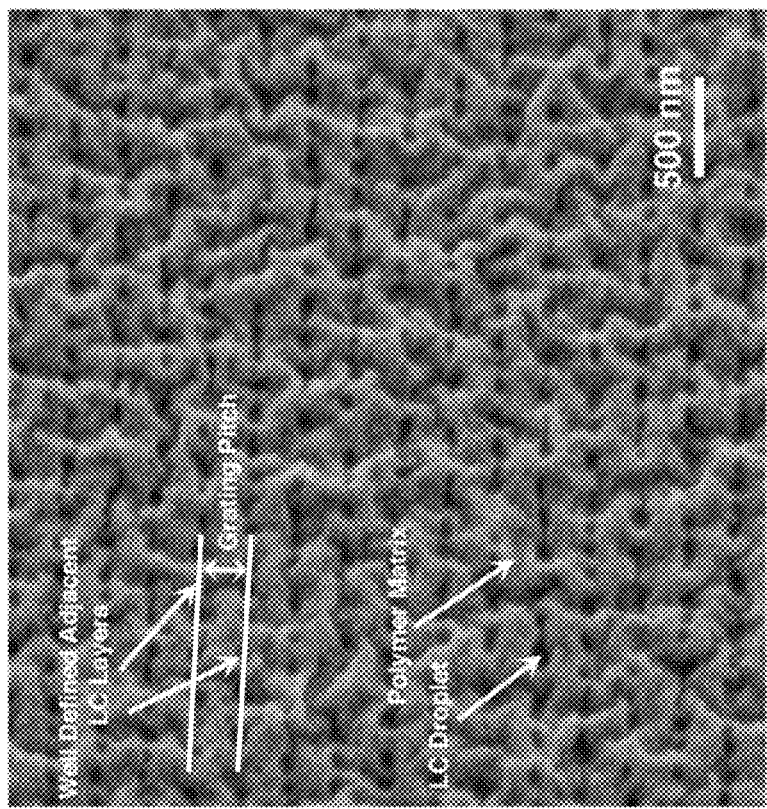

Nanoscale internal morphology of broadband HPDLC gratings may be studied using microscopy techniques, for example a scanning electron microscopy (SEM) technique can be used. FIGS. 5A and 5B depicts SEM micrograph images of a single wavelength reflecting and broadband wavelength reflecting HPDLC mediums respectively. In FIG. 5A the dark voids are liquid crystal (LC) droplets surrounded by a polymer matrix. The dark LC voids are arranged in parallel layers forming a periodic Bragg grating structure. The distance between the LC layers is termed as the grating pitch. The grating pitch is typically uniform for single wavelength reflecting HPDLC mediums. FIG. 5B represents a broadband wavelength reflecting HPDLC medium. Due to dynamic movement of a holography apparatus during fabrication, multiple gratings may be formed resulting in an overlapping LC layer structure. This structure results in a non uniform grating pitch and a broadening of the wavelength reflected by the HPDLC medium of FIG. 5B.

Various grating characteristics of HPDLC mediums may be analyzed to optimize performance. For example, the uniformity of the wavelength reflection peak can be determined. The exposed HPDLC medium may be analyzed using a spectra-radiometer to measure reflection properties of the gratings in multiple locations to ensure uniformity in the exposure process. Other parameters to be examined within each measurement may include wavelength peak, reflection intensity, spatial uniformity, and the like. In another example, the wavefront may be analyzed. Maintaining the wavefront properties of individual wave packets as they interact with the reflecting film ensures accurate measurement at the detector. In yet another example, HPDLC mediums may be examined using a white light interferometer, for example, to measure scatter. Scattering of reflected and transmitted light may result in stray measurements and noise at the detector. This scattering effect may be characterized and compared to scatter effects from existing reflective technologies in order to mitigate or minimize the effect. In yet another example, electro-optic switching properties of an HPDLC medium can be analyzed. This may be accomplished with the use of a spectra-radiometer and high-voltage (e.g., ~100V pp) switching setup, for example. When a high-frequency (e.g., 1 kHz) oscillating wave is applied to an HPDLC medium, the liquid crystal droplets align, effectively 'washing out' the Bragg grating. This enables partial switching of the entire grating, which can be used to 'grayscale' or vary the intensity of the grating. An HPDLC medium may be analyzed for uniformity in color purity, intensity, focal length and direction, and polarization during dynamic switching and grayscale switching.

The optical output behavior of reflective HPDLCs may be modeled using methods such as coupled wave theory and matrix approaches. To enable such modeling each layer of polymer and liquid crystal may be considered individually stacked, forming a periodic grating profile. In the coupled wave theory approach, the dielectric medium is typically isotropic and the refractive index varies in a sinusoidal fashion. The reflected beam may be coupled to the incident beam, giving an expression for the energy transfer efficiency. Different matrix approaches also can be used to deduce the output of the HPDLCs by considering Maxwell's equations in a matrix form. A 2×2 matrix approach has 2 element field vectors. The liquid crystal (LC) layer may be assumed to be isotropic. In a 4×4 matrix approach, there are 4 field vectors corresponding to electric and magnetic fields for 2 independent polarization modes. This may be useful for describing birefringent LCs. The characteristic matrix for LC and polymer layers, beginning from one end of the stack, may be computed and then the field vectors may be propagated to the other end of the stack by taking the product of the individual layer transfer matrices. A particular HPDLC reflecting wavelength can be tailor-made by theoretically modeling them individually.

Figures 6A, 6B:
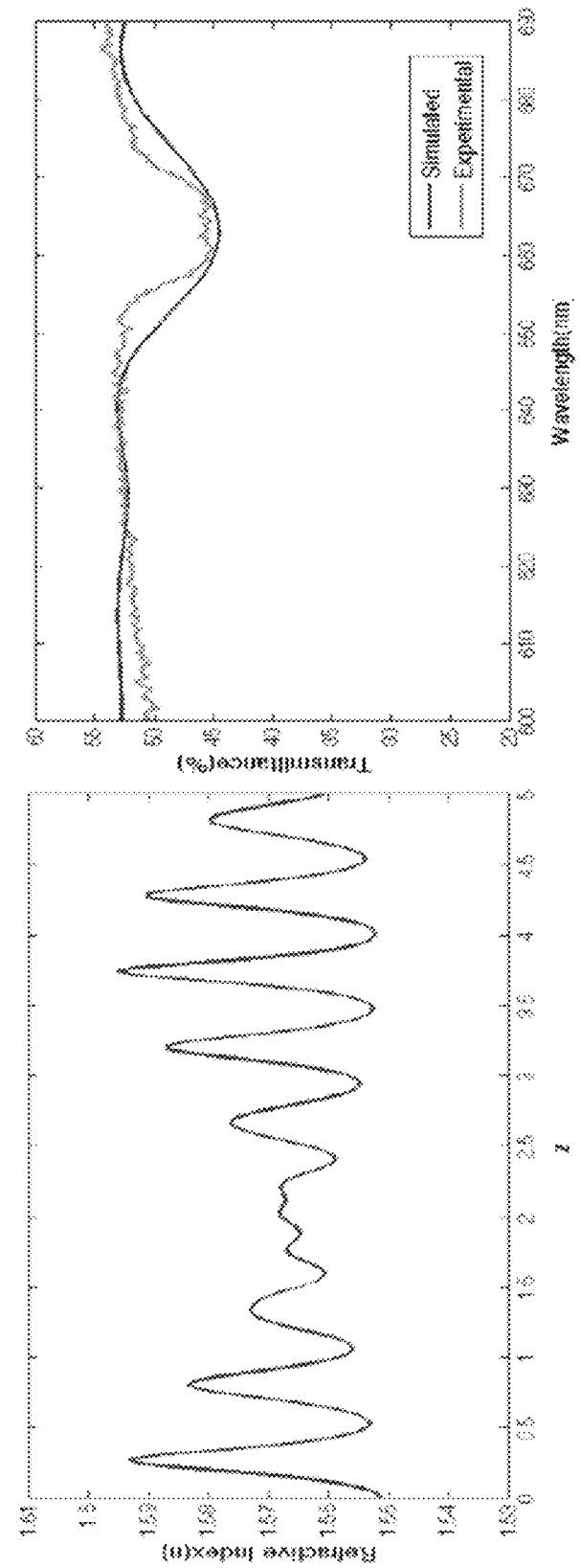
FIGS. 6A and 6B depict modeling techniques that may be used to predict the output response of holographic polymer dispersed liquid crystal mediums.

For example, FIGS. 6A and 6B depict an example of theoretical modeling of a broadband HPDLC medium using Berreman's 4×4 matrix technique. Generally, the refractive index of a broadband grating is not uniform due to overlapping reflective gratings. This phenomena can be modeled by using a phenomenological diffusion model. FIG. 6A shows a modeled non uniform refractive index profile of an example broadband grating. Here, the unit z depicts the thickness of the grating in microns. By substituting the refractive index profile using Berreman's 4×4 matrix technique, the output of the broadband grating can be accurately predicted and/or modeled as depicted in FIG. 6B. Thus, one can first theoretically design a desired HPDLC reflecting wavelength spectrum using the Berreman 4×4 technique and the phenomenological diffusion model. The parameters resulting from the theoretical prediction can be used to fabricate the HPDLC medium corresponding to the desired spectrum. In an example configuration, modeling may be used utilized to predict the output of a broadband HPDLC medium.

In an embodiment, broadband HPDLC mediums formed using the methods and apparatus disclosed herein may be utilized to form lightweight mirrors with electronically switchable focal points for remote sensing. Broadband HPDLC mediums may be stacked in one configuration of such a mirror. Electrically switchable thin-film polymeric mirror stacks exhibit good optical characteristics and typically only weigh several pounds, even when including drive electronics. In an example configuration, each layer of the mirror stack comprises a spherically curved Bragg grating with a focal point independent from the other layers. This configuration enables such applications as electrically refocused virtual mirrors for instrument clustering.

Broadband HPDLC mirror stacks as disclosed herein may be constructed by forming, for example, 5 cm diameter broadband HPDLC reflecting mirrors, and laminating them together. One laminating technique that may be used in the construction of a mirror stack comprises gluing the HPDLC mirror films together using optical adhesive. To adhere multiple HPDLC mirror films together using optical adhesive, the HPDLC mirror films may be formed on traditional ITO-coated glass substrates, and may be laminated into a stack using optical adhesive. An example of a suitable adhesive is Norland Optical Adhesive 71, as it possesses several advantageous characteristics, for example UV optical curing that permits precise alignment with no time pressure, very low absorption in the visible wavelength regime resulting in low optical transmission loss, and index of refraction matching the glass substrates, but other adhesives may be used.

Another technique for laminating HPDLC mirror films together to form a mirror stack involves transferring the HPDLC mirror films (after holographic exposure) to index matched polymeric substrates coated with conducting layers, thereby reducing optical losses through the stack. The HPDLC mirror stack laminating techniques disclosed herein are merely examples. Alternative laminating techniques may be obvious to those skilled in the art, and are meant to be included within the scope of this disclosure.

A broadband HPDLC medium with one or more spherically curved Bragg gratings may be formed using the above-disclosed apparatus and techniques, wherein the exposure technique incorporates a spherical wave to form spherical focusing reflection gratings. To create spherical interference patterns in a pre-polymer mixture, spherical beam expanding methods may used to holographically expose the pre-polymer mixture. Spherical beam expanding methods may also be used to examine the optical qualities of the resulting spherical gratings. Exposure methods may be adjusted to compensate characteristics of the pre-polymer mixture. For example, the aforementioned holographic techniques work by creating volume interference patterns, which are recorded regardless of the media, and may need to be altered to form high-quality gratings due to the volume of the pre-polymer mixture. Spherically expanded laser beams may be used to form a spherically curved Bragg reflection grating. Exposure condition factors that may be considered during formation include beam power, beam expansion quality, beam coherence, and time of exposure.

Figure 7A:
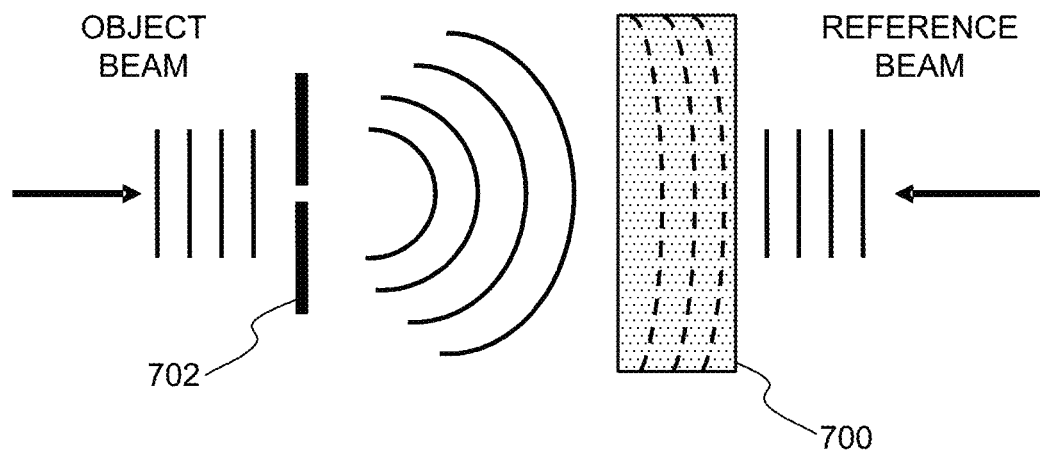
FIGS. 7A and 7B depict example techniques for spherically expanding an object beam from a laser light source.
Figure 7B:
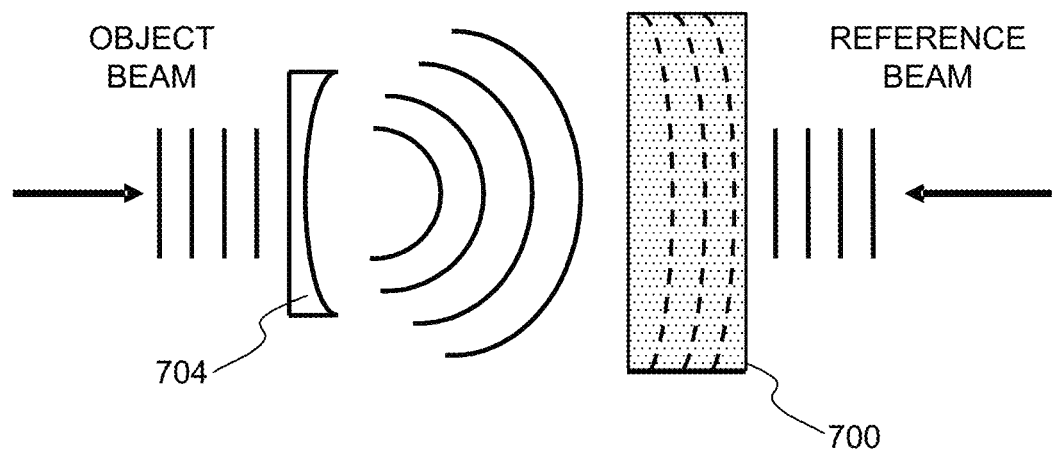

FIGS. 7A and 7B depict two methods of creating spherically expanded laser beams. The first method, depicted in FIG. 7A involves placing a plate having a pinhole 702 between the object beam from a laser light source and the pre-polymer mixture 700. Passing through the pinhole causes spherical expansion of the object beam wavefront. The spherically expanded object beam interferes in the pre-polymer mixture with the plane wavefronts of a reference beam, forming an interference pattern in the pre-polymer mixture and resulting in a focusing, curved grating pattern of high index (liquid crystal) and low index (polymer) layers.

The second method, depicted in FIG. 7B involves placing a plano-concave lens 704 between the object beam from a laser light source and the pre-polymer mixture 700. Passing through the plano-concave lens causes spherical expansion of the object beam wavefront. The spherically expanded object beam interferes in the pre-polymer mixture with the plane wavefronts of a reference beam, forming an interference pattern in the pre-polymer mixture and resulting in a focusing, curved grating pattern of high index (liquid crystal) and low index (polymer) layers.

An example application of electrically-switchable thin-film polymeric mirrors lies in the optics systems of satellites. A significant limiting factor for satellite design is overall weight, particularly the relatively heavy optics associated with the primary mirrors typically used in satellites for collecting and focusing light on instrumentation, for example cameras, spectrometers, and the like. Additional design considerations include potential complications and weight associated with mechanically-operated beam steering optics typically necessary to utilize multiple instruments with a single primary collection mirror. Current state-of-the-art satellite optics technology employs polished aluminum mirrors, weighing up to several hundred pounds for a one-meter diameter mirror. Cost per pound of payload launched into low earth orbit typically places severe restrictions on the size and extent of light collection devices that can be included on specific missions. The herein described electrically-switchable thin-film polymeric mirrors may allow clustering of multiple scientific instruments around a single lightweight primary mirror and redirection of the focal point of the mirror to individual instruments, using devices that do not require moving parts.

Figure 8:
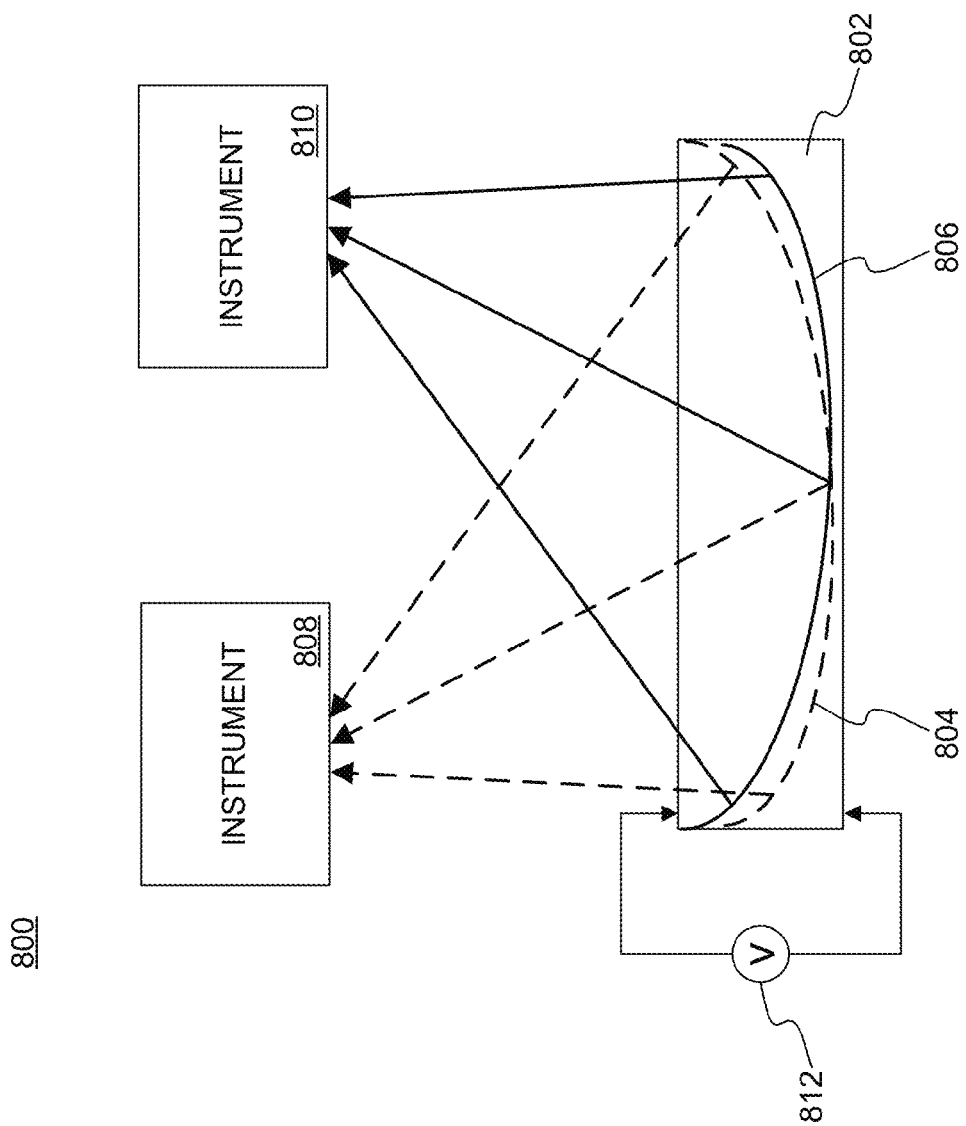
FIG. 8 depicts an example apparatus comprising an electrically-switched holographic polymer dispersed liquid crystal thin-film polymeric mirror stack.

FIG. 8 depicts an example apparatus 800 comprising an electrically-switched thin-film polymeric mirror stack 802. The mirror stack may be constructed from broadband HPDLC thin films as formed as disclosed herein. Two spherically curved Bragg gratings 804 and 806 are focused on instruments 808 and 810 respectively. Instruments 808 and 810 may be any instrumentation for which switchable mirror optics is desirable, for example cameras, spectrometers, and the like. The mirror stack may be electrically-switchable, for example by application of a voltage 812. In an embodiment, varying the voltage applied to the HPDLC may cause grating 804 to be transparent, while grating 806 reflects a broadband peak wavelength to instrument 810. A different variation of applied voltage may cause grating 806 to become transparent while grating 804 reflects a broadband peak wavelength to instrument 808. Thus, by simply varying the applied voltage, different mirrors in the HPDLC stack may be quickly and efficiently turned "on" and "off," effectively changing the mirror stack's focus between different instruments. In this manner, an electrically-switched thin-film polymeric mirror stack may serve to replace typical mechanically-operated beam steering optics. It may also be possible using the techniques disclosed herein to direct reflected light properties including wavefront, scatter, and polarization. The electrically-switchable mirrors disclosed herein may also be useful a number of other applications, for example LIDAR, radar mapping, oceanographic measurements, and spectral analysis.

The electrically-switchable mirrors disclosed herein may also incorporate wavelength filtering capabilities. For example, when electrically-switchable mirrors comprise a multi-color stack, individual HPDLC mediums can be electrically tuned to reject any given visible wavelength through color addition algorithms. A simple example configuration comprises a three-color red-green-blue stack, however, many different color HPDLC mediums can be stacked allowing for finer control over the wavelengths reflected. Wavelength filtering using HPDLC mirror stacks is particularly suited to charge-coupled device (CCD) color filtration, for example in remote sensing and hyperspectral work, where it is desirable to avoid the use of moving parts.

Various characteristics of spherically curved gratings can be analyzed to optimize performance. For example, the uniformity of the wavelength reflection peak can be determined. The exposed HPDLC medium may be analyzed using a spectra-radiometer to measure reflection properties of the curved gratings in multiple locations to ensure uniformity in the exposure process. Parameters to be examined within each measurement may include wavelength peak, reflection intensity, spatial uniformity, and the like. In another example, the wavefront may be analyzed. Maintaining the wavefront properties of individual wave packets as they interact with the reflecting film ensures accurate measurement at the detector. In yet another example, HPDLC mediums may be examined using a white light interferometer, for example, to measure scatter. Scattering of reflected and transmitted light may result in stray measurements and noise at the detector. This scattering effect may be characterized and compared to scattering effects of existing mirror technologies in order to mitigate or minimize this effect. In yet another example, Electro-optic switching properties of spherically curved gratings can be analyzed. This may be accomplished with the use of a spectra-radiometer and high-voltage (e.g., ~100V p-p) switching setup, for example. When a high-frequency (e.g., 1 kHz) oscillating wave is applied to the spherically curved gratings, the liquid crystal droplets align, effectively 'washing out' the Bragg grating. This enables partial switching of the entire grating, which can be used to 'grayscale' or vary the intensity of the grating. Spherically curved gratings may be analyzed for uniformity in color purity, intensity, focal length and direction, and polarization during dynamic switching and grayscale switching.

In order to effectuate transfer of an HPDLC medium by releasing a glass substrate from an HPDLC sample, thereby facilitating grating surface metrology, the surfaces of the glass substrates may be treated prior to holographic exposure with a release agent (e.g., surfactants such as Tween and Brix). Treatment with a release agent facilitates complete removal of an HPDLC medium. Following holographic exposure, one glass substrate may be released from the HPDLC medium and HPDLC medium removed. The grating film may then be adhered to an index-matched polymeric substrate coated with an index-matched conducting substrate using the same polymer employed in the grating matrix of the HPDLC medium (e.g., acrylated urethane). An example substrate suited for this purpose is poly-methyl-meth-acrylate (PMMA) coated with Baytron-P conducting polymer, but other substrates may be used. The remaining glass substrate may then be similarly replaced with a second polymeric substrate. If this process is repeated, an index matched completely polymeric HPDLC mirror stack may be formed. In an example process, hardening polymers (e.g., Norland Optical Adhesive 63 and/or 68) may be added to the prepolymer mixture, to increase the toughness of the resulting HPDLC medium.

The dynamically formed broadband HPDLC mediums disclosed herein have useful applications in a wide array of optical devices, for example optical devices designed for beam steering for instrument clusters, hyperspectral imaging, wavelength filtering. Beam steering using stacked broadband HPDLC films with spherically curved gratings can provide the ability to selectively focus specific wavelengths among numerous instruments, for example in space-borne satellite applications. The high color purity exhibited by these HPDLC mediums is a desirable feature for hyperspectral imaging, where objects may be analyzed using different spectral sections. Use of broadband HPDLC mediums as light filters can allow for higher device sensitivity and reliability. Optical devices incorporating these broadband HPDLC mediums may: contain no moving parts; be light weight; and have small physical footprints compared to typical prisms and lenses, thus providing critical advantages when vibration, weight, and real estate are critical design parameters.

Broadband HPDLC mediums are well suited for use in full-color reflective displays, where their high color purity and balanced white point are desirable. Also, H-PDLC films have demonstrated sub-millisecond response times because of the large surface-to-volume ratio, making video rate switching, and perhaps time sequential switching, possible. Other useful applications for broadband HPDLC mediums in optical devices include electrically controllable lenses for use in remote sensing, filter arrays for display and wavelength filtering, optical color filters for micro-displays, application-specific integrated lenses to perform the function of individual lenses, mirrors, prisms, electro-optic switches for routing particular wavelengths, tunable photonic crystals, and controllable photomasks.

What is claimed is:

1. A holographic polymer dispersed liquid crystal film that reflects a hyperspectral continuum of optical energy within a spectrum of wavelengths, the holographic polymer dispersed liquid crystal film comprising:
    a continuous polymer phase comprising an acrylate-containing polymer; and
    an overlapping liquid crystal layer structure within the continuous polymer phase, the holographic polymer dispersed liquid crystal film exhibiting:
        a hyperspectral continuum of peak reflective wavelengths produced by a continuous exposure process exhibiting a uniform reflectance and ranging from a first peak reflective wavelength indicative of a first end of the spectrum to a second peak reflective wavelength greater than the first peak reflective wavelength, the second peak reflective wavelength indicative of a second end of the spectrum, inclusively, wherein:
            each and every point of the hyperspectral continuum of peak reflective wavelengths is indicative of a peak reflectance of a respective wavelength of a respective Bragg reflection grating;
            the hyperspectral continuum of peak reflective wavelengths between the first and second peak reflective wavelengths having a full width at half maximum (FWHM) in a range of from 15 nm to 100 nm or 100 nm or greater;
            the holographic polymer dispersed liquid crystal film exhibits a scattering intensity less than $1 \times 10^{-7}$ dB outside the hyperspectral continuum of peak reflective wavelengths; and
            the hyperspectral continuum of peak reflective wavelengths is electrically controllable by switching fields of about 15 to 20 Volts per micrometer at switching times of less than 2 milliseconds;
    wherein the holographic polymer dispersed liquid crystal film comprises a plurality of reflective gratings within the holographic polymer dispersed liquid crystal film, and at least one of the plurality of reflective gratings is curved.

2. The holographic polymer dispersed liquid crystal film of claim 1, wherein the plurality of reflective gratings reflect the hyperspectral continuum of optical energy towards a focal point.

3. The holographic polymer dispersed liquid crystal film of claim 2, wherein the focal point is electrically controllable.

4. A stacked polymeric mirror comprising a plurality of stacked holographic polymer dispersed liquid crystal films of claim 1.

5. The stacked polymeric mirror of claim 4, wherein:
    each of the plurality of stacked holographic polymer dispersed liquid crystal films reflects the hyperspectral continuum of optical energy towards a respective one of a plurality of focal points, and
    the stacked mirror is further electrically controllable to switch reflection of the hyperspectral continuum of optical energy among the plurality of focal points.

6. The stacked polymeric mirror of claim 5, wherein the plurality of focal points comprise an instrument cluster.

7. The holographic polymer dispersed liquid crystal film of claim 1, in which the hyperspectral continuum of peak reflective wavelengths exhibits a full width at half maximum in a range of 15 nm to 100 nm.

8. The holographic polymer dispersed liquid crystal film of claim 1, in which the hyperspectral continuum of peak reflective wavelengths exhibits a full width at half maximum of 100 nm or greater.

9. The holographic polymer dispersed liquid crystal film of claim 1, wherein the acrylate-containing polymer is an acrylated urethane polymer.

10. A method comprising:
continuously exposing a stationary film comprising a mixture of a continuous photo-polymerizable acrylate-containing pre-polymer phase and a liquid crystal material distributed within the continuous photo-polymerizable acrylate-containing pre-polymer phase to a movable energy beam, while continuously varying an angle of incidence between the movable energy beam and the stationary film throughout a range of angles between a first angle and a second angle, inclusively, over a time, t, wherein:
the continuous photo-polymerizable acrylate-containing pre-polymer phase has a gelation time upon exposure to the movable energy beam over time, t, that is comparable to the time of the continuously varying of the angle of incidence between the movable energy beam and the stationary film throughout the range of angles;
the variation of the angle of incidence is nonlinear;
the exposure creating a plurality of interference patterns within the film, each of the plurality of interference patterns corresponding to a respective angle of the range of angles
by photo-polymerizing the continuous photo-polymerizable acrylate-containing pre-polymer phase to form a holographic polymer dispersed liquid crystal film comprising a continuous acrylate-containing polymer phase and an overlapping liquid crystal layer structure distributed within the continuous acrylate-containing polymer phase, with the plurality of interference patterns forming a resultant plurality of Bragg reflection gratings in the film, each Bragg reflective grating corresponding to a respective angle within the range of angles of exposure, the resultant plurality of Bragg reflection gratings reflecting a hyperspectral continuum of peak reflective wavelengths ranging from a first peak reflective wavelength indicative of a first end of the spectrum to a second peak reflective wavelength greater than the first peak reflective wavelength, the second peak reflective wavelength indicative of a second end of the spectrum, wherein each and every point of the hyperspectral continuum of peak reflective wavelengths is indicative of a peak reflectance of a respective wavelength of a respective reflection grating and is electrically controllable by switching fields of about 15 to 20 Volts per micrometer at switching times of less than 2 milliseconds.

11. The method of claim 10, wherein the angle of incidence between the movable energy beam and the stationary film is continuously varied via at least one of rotation or translation.

12. The method of claim 11, wherein the rotation or the translation is with respect to one or more elements of a holography apparatus.

13. The method of claim 12, wherein the one or more elements of the holography apparatus comprise at least one of a mirror or a beam splitter.

14. The method of claim 10, further comprising:
splitting the movable energy beam into a plurality of movable energy beams;
causing the plurality of movable energy beams to be simultaneously incident on the stationary film; and
exposing while continuously varying an angle of incidence between at least one of the plurality of movable energy beams and the stationary film throughout the range of angles between the first angle and the second angle, inclusively.

15. The method of claim 14, wherein at least two of the plurality of movable energy beams are counter propagating.

16. The method of claim 10, wherein the plurality of interference patterns is created using a prism.

17. The method of claim 10, wherein the plurality of interference patterns is created using a mirror.

18. The method of claim 10, wherein the acrylate-containing polymer is an acrylated urethane polymer.

19. A holographic polymer dispersed liquid crystal film that reflects a hyperspectral continuum of optical energy within a spectrum prepared using the method of claim 10; wherein
the hyperspectral continuum of peak reflective wavelengths between the first and second peak reflective wavelengths has a full width at half maximum (FWHM) in a range of from 15 nm to 100 nm or 100 nm or greater; and
the holographic polymer dispersed liquid crystal film exhibits a scattering intensity less than $1 \times 10^{-7}$ dB outside the hyperspectral continuum of peak reflective wavelengths.

20. A holographic polymer dispersed liquid crystal film that reflects a hyperspectral continuum of optical energy within a spectrum prepared using an operating system comprising:
a film of polymer dispersed liquid crystal precursor comprising a mixture of a continuous photo-polymerizable acrylate-containing pre-polymer phase and a liquid crystal material distributed within the continuous photo-polymerizable acrylate-containing pre-polymer phase, the film of polymer dispersed liquid crystal precursor having a surface;
an energy beam source initially focused to direct an energy beam at a first angle of incidence to the surface of the film of polymer dispersed liquid crystal precursor;
a stationary sample stage for supporting the film of polymer dispersed liquid crystal precursor; and
at least one dynamically positionable element which comprises at least one of a beam splitter mounted on a respective motorized stage or a mirror mounted on a respective motorized stage; wherein
the operating system, when operating, continuously delivers the energy beam to the film of polymer dispersed liquid crystal precursor, at an angle of incidence between the energy beam generated by the energy beam source and the surface of the film of polymer dispersed liquid crystal precursor that varies continuously and nonlinearly during exposure of the energy beam to the surface from the first angle of incidence to a second angle of incidence over the course of time, t,
wherein the holographic polymer dispersed liquid crystal precursor has a gelation time upon exposure to the energy beam that is comparable to time, t, such that
the continuous exposure polymerizes the acrylate-containing pre-polymer to form a holographic polymer dispersed liquid crystal (HPDLC) film comprising a continuous acrylate-containing polymer phase and an overlapping liquid crystal layer structure within the continuous acrylate-containing polymer phase, the HPDLC film further comprising a plurality of Bragg gratings that reflect a hyperspectral continuum of multiple wavelengths of optical energy within a spectrum ranging from a first peak reflective wavelength indicative of a first end of the spectrum to a second peak reflective wavelength, wherein each and every point of the hyperspectral continuum of peak reflective wavelengths is indicative of a peak of a respective wavelength of a respective reflection grating;

wherein the hyperspectral continuum of peak reflective wavelengths between the first and second peak reflective wavelengths has a full width at half maximum (FWHM) in a range of from 15 nm to 100 nm or 100 nm or greater; and the holographic polymer dispersed liquid crystal film exhibits a scattering intensity less than $1\times10^{-7}$ dB outside the hyperspectral continuum of peak reflective wavelengths.

21. The holographic polymer dispersed liquid crystal film of claim 20, in which the hyperspectral continuum of peak reflective wavelengths exhibits a full width at half maximum in a range of from 15 nm to 100 nm.

22. The holographic polymer dispersed liquid crystal film of claim 20, in which the hyperspectral continuum of peak reflective wavelengths exhibits a full width at half maximum of 100 nm or greater.

23. The holographic polymer dispersed liquid crystal film of claim 20, wherein the acrylate-containing pre-polymer is an acrylated urethane pre-polymer and the acrylate-containing polymer is an acrylated urethane polymer.

* * * * *